(12) United States Patent
Itoga (10) Patent No.: US 8,825,305 B2
(45) Date of Patent: Sep. 2, 2014

(54) COLLISION DETERMINATION SYSTEM, OCCUPANT RESTRAINT SYSTEM, AND VEHICLE

(75) Inventor: Yasuo Itoga, Tokyo (JP)

(73) Assignee: Takata Corporation, Tokyo (JP)

( * ) Notice: Subject to any disclaimer, the term of this patent is extended or adjusted under 35 U.S.C. 154(b) by 286 days.

(21) Appl. No.: 13/132,309

(22) PCT Filed: Oct. 26, 2009

(86) PCT No.: PCT/JP2009/068334
§ 371 (c)(1),
(2), (4) Date: Jun. 1, 2011

(87) PCT Pub. No.: WO2010/067667
PCT Pub. Date: Jun. 17, 2010

(65) Prior Publication Data
US 2011/0231067 A1 Sep. 22, 2011

(30) Foreign Application Priority Data

Dec. 9, 2008 (JP) .................................. 2008-313412

(51) Int. Cl.
| | | |
|---|---|---|
| *G06F 19/00* | (2011.01) | |
| *B60R 21/0134* | (2006.01) | |
| *B60R 21/00* | (2006.01) | |
| *B60R 21/01* | (2006.01) | |

(52) U.S. Cl.
CPC ..... *B60R 21/0134* (2013.01); *B60R 2021/0025* (2013.01); *B60R 2021/01265* (2013.01)
USPC ................. 701/46; 701/45; 701/47; 340/436; 340/435; 340/438; 180/271; 180/274; 180/282

(58) Field of Classification Search
USPC ................. 701/46, 47, 45, 301; 280/734, 735; 340/436, 438, 435, 902, 903; 180/271, 180/274
See application file for complete search history.

(56) References Cited

U.S. PATENT DOCUMENTS

| | | | |
|---|---|---|---|
| 5,436,838 | A | 7/1995 | Miyamori |
| 6,327,527 | B1 | 12/2001 | Imai et al. |

(Continued)

FOREIGN PATENT DOCUMENTS

| | | |
|---|---|---|
| JP | 06-099787 | 4/1994 |
| JP | 07-047915 | 2/1995 |

(Continued)

OTHER PUBLICATIONS

Supplementary European Search Report EP 09 83 1773 dated Jun. 21, 2012.

(Continued)

*Primary Examiner* — Adam Tissot
(74) *Attorney, Agent, or Firm* — Foley & Lardner LLP (57) ABSTRACT

The invention provides an effective technique for appropriately restraining a vehicle occupant at the time of a side collision of a vehicle. An occupant restraint system mounted to a vehicle comprises a camera, a side impact sensor, an acceleration sensor, an ECU, and an airbag module. The ECU changes a threshold value setting for collision velocity at the time of a side collision of the vehicle according to whether or not a colliding object involved in the side collision of the vehicle is a pole-like object, and controls the airbag module based on the set threshold value.

9 Claims, 4 Drawing Sheets

(56) References Cited

U.S. PATENT DOCUMENTS

| | | |
|---|---|---|
| 6,561,301 B1 | 5/2003 | Hattori et al. |
| 2004/0129479 A1 | 7/2004 | Ozaki |
| 2007/0106474 A1 | 5/2007 | Ide |
| 2007/0227798 A1 | 10/2007 | Takehara et al. |
| 2007/0228703 A1 | 10/2007 | Breed |
| 2008/0029329 A1* | 2/2008 | Aoki et al. .................. 180/274 |
| 2008/0243343 A1 | 10/2008 | Kumagai et al. |
| 2009/0326764 A1* | 12/2009 | Rao et al. ................... 701/45 |

FOREIGN PATENT DOCUMENTS

| | | |
|---|---|---|
| JP | 07-117623 | 5/1995 |
| JP | 07-172262 | 7/1995 |
| JP | 11-310095 | 11/1999 |
| JP | 2000-142310 | 5/2000 |
| JP | 2000-233708 | 8/2000 |
| JP | 2003-261003 | 9/2003 |
| JP | 2004-212281 | 7/2004 |
| JP | 2007-126014 | 5/2007 |
| JP | 2007-269279 | 10/2007 |
| JP | 2008-037181 | 2/2008 |
| JP | 2008-105634 | 5/2008 |
| JP | 2008-137491 | 6/2008 |
| JP | 2008-195230 | 8/2008 |
| JP | 2008-247277 | 10/2008 |
| JP | 2008-273415 | 11/2008 |
| WO | WO 01/36983 A2 | 5/2001 |

OTHER PUBLICATIONS

International Search Report in PCT/JP2009/068334 dated Jan. 19, 2010.

* cited by examiner

COLLISION DETERMINATION SYSTEM, OCCUPANT RESTRAINT SYSTEM, AND VEHICLE

BACKGROUND OF THE INVENTION

1. Field of the Invention

The present invention relates to a technique for determining the collision particulars of a vehicle.

2. Description of the Related Art

In prior art, a variety of vehicle impact sensors configured to detect the occurrence of a collision at the time of a vehicular accident are known. For example, in JP, A, 07-172262 described below, there is disclosed a system configured to detect a side collision using a G sensor and contact sensor that are activated at the time of vehicular side collision. However, in a system that restrains a vehicle occupant at the time of a vehicular accident based on an occupant restraint system such as an airbag module, an advanced detection technique capable of immediately detecting the occurrence of vehicle collision to improve occupant restrainability has been desired. In particular, for a side collision such as described in JP, A, 07-172262, only a vehicle door exists between a vehicle occupant and a colliding object and, in the event of a pole collision in which the colliding object having a pole-like shape, such as a telephone pole or standing tree, collides with the vehicle door from the side, the high penetration velocity from the door toward the vehicle interior requires determination of the side collision particulars in a shorter period of time than a front collision. In addition, when the colliding object is pole-like in shape, the effect on the vehicle occupant at the time of a side collision is known to be higher than that when the colliding object is barrier-like in shape, such as a wall or another vehicle, resulting in the need for a technique that appropriately controls the form of restraint on the vehicle occupant at the time of a side collision in accordance with the colliding object type.

SUMMARY OF THE INVENTION

The present invention was designed in light of the above, and it is therefore an object of the present invention to provide an effective technique for appropriately restraining a vehicle occupant at the time of a vehicular side collision.

Means for Solving the Problems

The present invention is applied to resolve the above-described problems. While typically applicable to techniques for determining information related to a side collision that occurs on an automobile, the present invention can similarly be applied to techniques for detecting information related to a side collision that occurs on a vehicle other than an automobile. The term "vehicle" here includes a variety of vehicles, such as automobiles, trains, buses, and trucks.

The collision determination system according to the present invention is a system mounted in a vehicle, and includes a camera, a side impact sensor, a motion detecting portion, a determination processing portion, a threshold value setting portion, and a controller. Of these components, the determination processing portion, threshold value setting portion, and controller may be individual processing elements or a single processing element.

The camera is a camera for image detection that is arranged facing a lateral direction of the vehicle. The camera typically used is a single lens camera, such as a CMOS or CCD, or a stereo camera. This camera used may be a camera dedicated to the collision determination system or a camera that is also used in other applications. When the camera is used in other applications as well, the camera used may be, for example, at least one of a plurality of cameras used in a parking assistance system (such as a camera arranged on a front grill, side mirror, or rear roof, for example) for assisting the driver in vehicle parking operations, in order to reduce costs.

The side impact sensor is a sensor arranged in a partitioned region between the door outer panel and door inner panel of the vehicle door for detecting a side collision of the vehicle. The side impact sensor typically used is a coil sensor having a magnetic sensor coil disposed toward a detected object made of metal, or a pressure sensor configured to detect the deformation (collapse) of the vehicle door by a change in pressure within the vehicle door.

The motion detecting portion detects the amount of motion related to the motion that occurs at the time of a vehicular side collision. The "amount of motion related to the motion that occurs at the time of a vehicular side collision" broadly includes items such as the displacement acceleration, displacement velocity, and displacement distance of the vehicle at the time of the side collision. The determination processing portion determines the shape of the colliding object involved in the vehicular side collision based on images detected by the cameras. The threshold value setting portion sets as a first threshold value the threshold value related to the amount of motion when the determination processing portion determines that the colliding object is as an object other than a pole-like object, and sets as a second threshold value that is below the first threshold value the threshold value related to the amount of motion when the determination processing portion determines that the colliding object is a pole-like object.

The controller carries out a control having at least first and second control modes. The controller may have other control modes in addition to the first and second control modes. Here, the first control mode outputs a drive control signal to an occupant restraint device that restrains a vehicle occupant under the condition that the amount of motion detected by the motion detecting portion exceeds the first threshold value set by the threshold value setting portion when the side impact sensor detects a vehicular side collision and the colliding object is an object other than a pole-like object based on the determination results of the determination processing portion. On the other hand, the second control mode outputs a drive control signal to an occupant restraint device under the condition that the amount of motion detected by the motion detecting portion exceeds the second threshold value set by the threshold value setting portion when the side impact sensor detects a vehicular side impact and the colliding object is a pole-like object based on the determination results of the determination processing portion. Here, the term "pole-like object" broadly includes pole-shaped colliding objects, and is typically equivalent to a telephone pole or a standing tree, for example. Examples of colliding objects other than pole-like objects typically include flat-shaped barrier-like objects, such as a wall or other vehicle. Note that the controller may be a dedicated controller for the collision determination system, or a controller that is also used as means for controlling the drive of the engine driving system or electrical equipment system of the vehicle.

According to the above configuration of the collision determination system of the present invention, the threshold value setting for the amount of motion related to the motion at the time of a vehicular side collision changes in accordance with the shape or type of the colliding object, and the occupant restraint device is driven and controlled based on the set threshold value, making it possible to effectively deal with a pole collision which has an especially high effect on the vehicle occupant at the time of a side collision, and appropriately restrain the vehicle occupant at the time of a vehicular side collision.

The collision determination system of another embodiment according to the present invention is a system mounted in a vehicle, and includes a camera, a side impact sensor, a motion detecting portion, a determination processing portion, a second determination processing portion, a threshold value setting portion, and a controller. Of these components, the camera, side impact sensor, motion detecting portion, and determination processing portion have the same configurations as described above. In addition, the determination processing portion, second determination processing portion, threshold value setting portion, and controller may be individual processing elements or a single processing element.

The second determination processing portion determines the predicted collision area of the vehicle where the colliding object is collided, based on images detected by the cameras. The controller has at least first and second control modes. The controller may carry out a control of other control modes in addition to the first and second control modes. Here, the first control mode outputs a drive control signal to an occupant restraint device that restrains a vehicle occupant under the condition that the amount of motion detected by the motion detecting portion exceeds the first threshold value set by the threshold value setting portion when the side impact sensor detects a vehicular side collision, the predicted collision area is the vehicle door, and the colliding object is an object other than a pole-like object based on the determination results of the second determination processing portion. On the other hand, the second control mode outputs a drive control signal to an occupant restraint device that restrains a vehicle occupant under the condition that the amount of motion detected by the motion detecting portion exceeds the second threshold value set by the threshold value setting portion when the side impact sensor detects a vehicular side collision, the predicted collision area is the vehicle door, and the colliding object is a pole-like object based on the determination results of the second determination processing portion. This controller is capable of controlling the drive of the occupant restraint device based on a threshold value other than the first and second threshold values when the predicated collision area is not a vehicle door, such as when the predicted collision area is an area other than the vehicle door, based on the determination results of the second determination processing portion, and when the collision with the colliding object itself has been avoided. Note that the controller may be a dedicated controller for the collision determination system, or a controller that is also used as means for controlling the drive of the engine driving system or electrical equipment system of the vehicle.

According to the above configuration of the collision determination system of another embodiment of the present invention, the threshold value setting for the amount of motion related to the motion at the time of a vehicular side collision changes in accordance with the shape or type of the colliding object, and the occupant restraint device is driven and controlled based on the set threshold value, making it possible to effectively deal with a pole collision which has an especially high effect on the vehicle occupant at the time of a side collision, and appropriately restrain the vehicle occupant at the time of a vehicular side collision. Furthermore, the determination result of the second determination processing portion is reflected in the control of the controller, making it possible to drive and control the occupant restraint device only in a case where it has been predicted that the colliding object will collide with the vehicle door, thereby further improving the reliability of occupant restraint control.

Further, according to the collision determination system of yet another embodiment of the present invention, the above-described determination processing portion is preferably configured to determine that the colliding object is a barrier-like object in a case where the colliding object is an object other than a pole-like object. Here, the term "barrier-like object" broadly includes flat-shaped colliding objects, and is typically equivalent to a wall or other vehicle, for example. With this arrangement, the first threshold value for a pole collision having a relatively high effect on the vehicle occupant at the time of a side collision, and the second threshold value for a barrier collision having a relatively low effect on the vehicle occupant at the time of a side collision are established. Such a configuration makes it possible to appropriately control the occupant restraint device in accordance with whether the colliding object is a pole-like object or a barrier-like object.

Further, according to the collision determination system of yet another embodiment of the present invention, the above-described motion detecting portion is an acceleration sensor that is mounted to the vehicle and configured to detect information related to the acceleration that acts on the vehicle, and the system is preferably configured to detect the collision velocity related to the motion at the time of a vehicular side collision based on the acceleration information detected by the acceleration sensor. With such a configuration, the present invention provides a collision determination system capable of setting a threshold value that is related to the amount of motion, particularly the collision velocity, related to the motion at the time of a vehicular side collision, in accordance with the shape of the colliding object.

Further, according to the collision determination system of yet another embodiment of the present invention, the above-described side impact sensor is a coil sensor comprising a magnetic sensor coil disposed opposite a detected object made of metal that exists in the partitioned area between the door outer panel and door inner panel of the vehicle door, and is preferably configured to detect the amount of deformation related to the vehicle door at the time of a vehicular side collision as a change in distance from the detected object based on the change in current at the time of conduction of the magnetic sensor coil. In such a case, the detected object made of metal is a conductor or magnetic body that contains in part or in whole steel, copper, aluminum, and/or ferrite, for example. The "amount of deformation related to the vehicle door" here broadly includes the amount of deformation of the door outer panel of the vehicle door, and the amount of deformation of members deformed in association with the deformation of the door outer panel. This coil sensor is typically a member installed to a vehicle door side member in the partitioned region between the door outer panel and door inner panel of the vehicle door. The term "vehicle door side member" here refers to various members that face the partitioned region located between the door outer panel and door inner panel, such as the door inner panel, door frame, or a construction member (also referred to as a "door beam" or "reinforcement member") that is constructed long in shape between the door front end portion and door rear end portion and bends toward the vehicle interior in association with displacement of the door outer panel at the time of a side collision. With such a configuration, the coil sensor is a non-contact type sensor and, with characteristics such as high impact resistance, impact non-responsiveness, and low susceptibility to the environment, effectively maintains the detection accuracy of a vehicular side collision.

The occupant restraint system according to the present invention comprises at least the above-described collision determination system and the occupant restraint device that restrains a vehicle occupant based on the determination result of the collision determination system at the time of a vehicular side collision. Examples of an "occupant restraint device" typically include an airbag device (airbag module) that restrains an occupant with an airbag which deploys and inflates in an occupant restraint region, or a seatbelt device that restrains the chest and abdomen of an occupant seated in a vehicle seat via a seatbelt. In this case, when the airbag device is used as the occupant restraint device, the airbag device employed may have an airbag housed in the seat, pillar, or upper roof rail, for example. With such a configuration, the present invention provides an occupant restraint system capable of controlling the occupant restraint device by an appropriate determination by the above-described collision determination system.

The vehicle according to the present invention includes an engine driving system, electrical equipment system, drive controller, vehicle door, collision determination device, and occupant restraint device. The engine driving system functions as a system related to the driving of the engine and vehicle. The electrical equipment system functions as a system related to the electrical components used in the vehicle. The drive controller functions as a device having the function of controlling the drive of the engine driving system and electrical equipment system. The vehicle door functions as the door used by the occupant to get in and out of the vehicle and has a door outer panel that is displaced as the result of a side collision. The collision determination device functions as a device for determining the particulars of a side collision of the vehicle door. This collision determination device comprises the above-described collision determination system. The occupant restraint device restrains a vehicle occupant based on the determination result of the collision determination device at the time of a vehicular side collision. With such a configuration, the present invention provides a vehicle comprising an occupant restraint device controlled by the appropriate determination by the above-described collision determination system.

Advantages of the Invention

In particular, according to the present invention, a collision determination system employs a configuration wherein the threshold value setting of the amount of motion related to the motion at the time of a vehicular side collision is changed according to whether the colliding object involved in the vehicular side collision is a pole-like object or other type of object, controlling the occupant restraint device based on the set threshold value, thereby making it possible to effectively deal with a pole collision which has a high effect on the vehicle occupant at the time of a side collision, and thus appropriately restrain the vehicle occupant at the time of a vehicular side collision.

DETAILED DESCRIPTION OF THE PREFERRED EMBODIMENTS

An occupant restraint system 100 according to an embodiment of the "occupant restraint system" of the present invention will now be described with reference to FIG. 1 to FIG. 4. According to this embodiment, an airbag module capable of deploying and inflating an airbag toward an occupant restraint region at the time of an accident is employed as the occupant restraint device that restrains the occupant. This airbag module is installed for the driver's seat, passenger's seat, rear seats, etc.

Figure 1:
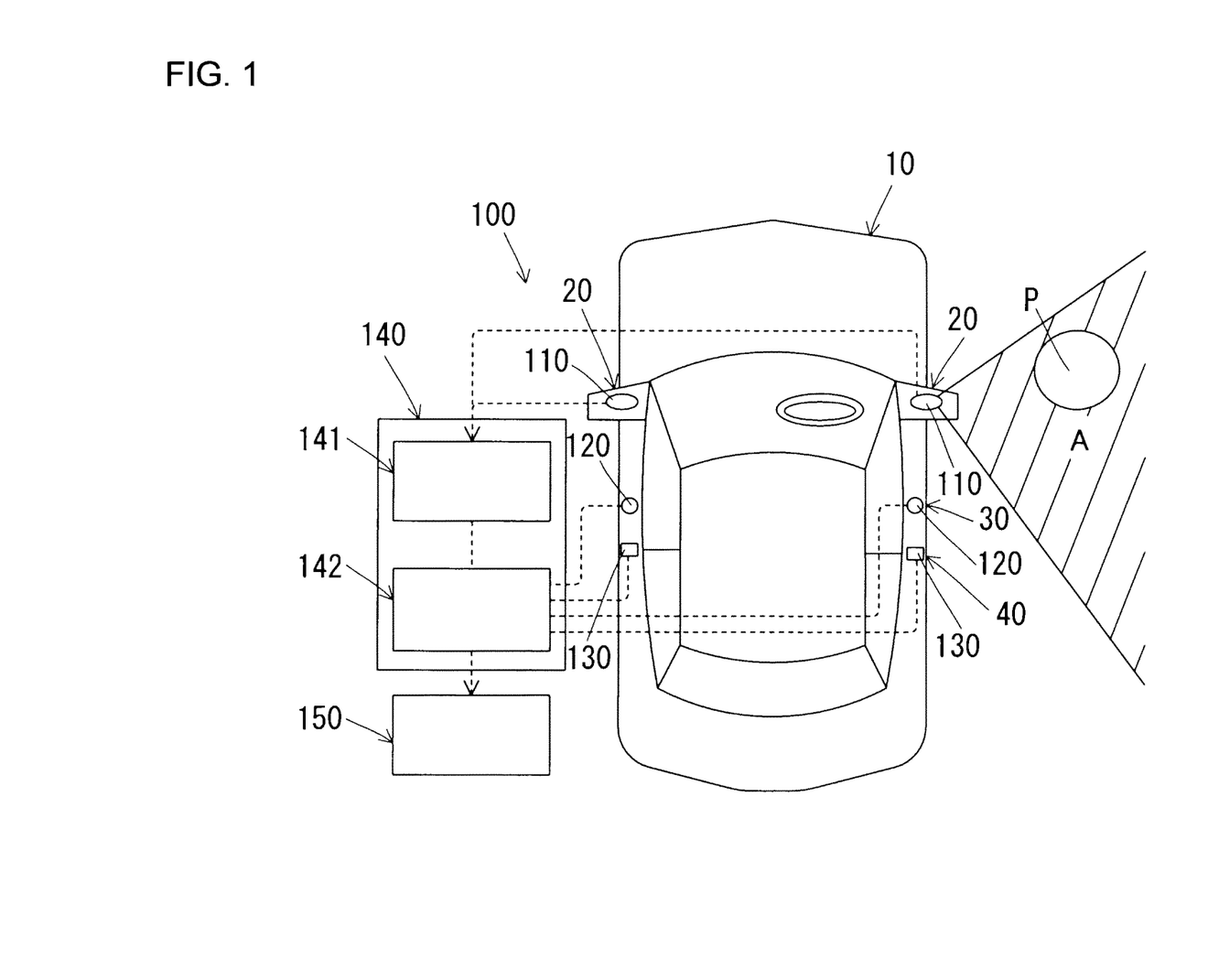
FIG. 1 is a view of the overall configuration of the occupant restraint system of an embodiment of the present invention.

FIG. 1 shows the typical state of the occupant restraint system 100 of this embodiment when it is mounted in a vehicle 10 occupied by a vehicle occupant. The vehicle 10 serving as the "vehicle" of the present invention, while not particularly shown, comprises a large number of vehicle components that make up the vehicle, an engine driving system that serves as a system related to the driving of the engine and vehicle, an electrical equipment system that serves as a system related to the electrical components used in the vehicle, and drive controlling means configured to control the drive of the engine driving system and electrical equipment system.

This occupant restraint system 100 is a system that controls the prompt restraint of a vehicle occupant at the time of a side collision accident of the vehicle 10, based on information related to the side collision. As shown in FIG. 1, this occupant restraint system 100 comprises cameras 110, side impact sensors 120, acceleration sensors 130, an ECU 140, and an airbag module 150.

The cameras 110 are typically cameras used for image detection (a single lens camera such as a CMOS or CCD, for example) that are arranged facing the lateral directions of the vehicle. This cameras 110 fulfill the function of detecting an image of a colliding object P positioned on the side of the vehicle 10, in particular the colliding object (also referred to as "obstacle") involved in the side collision of the vehicle 10. These cameras 110 are preferably mounted on left and right door mirror portions 20 of the vehicle 10. For example, the camera 110 installed on the door mirror portion 20 on the vehicle right side is capable of detecting an image of the colliding object P in detection region A in FIG. 1. The image detected by this camera 110 is then transmitted to an image processing ECU 141 described later within the ECU 140. Note that, when the cameras 110 are also used in other applications as well, the cameras may include at least one of a plurality of cameras used in a parking assistance system (the camera arranged on a front grill, side mirror, or rear roof, for example) for assisting the driver in vehicle parking operations, for example, in order to reduce costs. The camera 110 here is equivalent to the "camera for image detection" of the present invention.

The side impact sensor 120, while described in detail later, is arranged in the partitioned region between the door outer panel and door inner panel of a vehicle door 30. This side impact sensor 120 is a detection sensor configured to detect the amount of deformation of the door outer panel and the construction member (also referred to as "door beam" or "reinforcement member") of the partitioned region at the time of a side collision as a change in distance from a predetermined detected object defined in advance. The information detected by this side impact sensor 120 is then transmitted to an airbag module ECU 142 described later within the ECU 140. The side impact sensor 120 is typically preferably mounted to each of the respective door beams or reinforcement members mounted to the left and right vehicle doors. The side impact sensor 120 described here is equivalent to the "side impact sensor" and "coil sensor" of the present invention. Note that, in addition to this side impact sensor 120, other detection sensors configured to detect information related to a side collision may be suitably mounted to vehicle body side members, such as vehicle doors, rims, and pillars.

The acceleration sensor 130 is provided on a constructional element of the vehicle body of the vehicle 10. This acceleration sensor 130 detects the acceleration information related to the acceleration that acts on the vehicle 10 in three axial directions (axis X, axis Y, and axis Z) at the time of a side collision. The acceleration information detected by this acceleration sensor 130 is then transmitted to the airbag module ECU 142 described later within the ECU 140. This acceleration sensor 130 is typically preferably mounted on each of left and right B pillars 40 of the vehicle. The acceleration sensor 130 is capable of detecting the amount of motion (displacement acceleration, displacement velocity, and displacement distance) related to the motion at the time of a side collision of the vehicle 10, and is equivalent to the "motion detecting portion" and "acceleration sensor" of the present invention.

The ECU 140 comprises the image processing ECU 141 and the airbag module ECU 142. Each of the ECUs comprises a CPU (central processing unit), input/output device, memory device, drive device, peripheral devices, and the like. This ECU 140 may be a part of the control unit that serves as the drive controller (equivalent to the "drive controller" of the present invention) configured to control the engine driving system and electrical equipment system of the vehicle. The system comprising this ECU 140 and the cameras 110, side impact sensors 120, and acceleration sensors 130 is a collision determination system that determines information related to a side collision of the vehicle, and comprises the "collision determination system" and "collision determination device" of the present invention.

The image processing ECU 141 is a processing portion that processes images detected by the cameras 110. Specifically, this image processing ECU 141 executes first determination processing that determines the shape or type of the colliding object P of a side collision of the vehicle 10, and second determination processing that determines prior to the side collision the predicted collision area where the colliding object P is predicted to collide with the vehicle 10, based on images detected by the cameras 110. Specific examples of the first determination processing include determining whether or not the detected image of the colliding object P indicates an obstacle set in advance, such as a pole-like object such as a telephone pole, for example, or whether the detected image of the colliding object P indicates a pole-like object, a barrier-like object, or other type of object. Specific examples of the second determination processing include determining whether the collision area where the colliding object P is predicted to collide with the vehicle 10 is a vehicle door (an area occupied by a vehicle occupant). The processing results of this image processing ECU 141 are then transmitted to the airbag module ECU 142.

The image processing ECU 141 here is a determination processing portion that determines the shape of the colliding object P involved in a side collision of the vehicle 10 based on images detected by the cameras 110, and determines the predicted collision area of the colliding object P on the vehicle 10 based on the images detected by the cameras 110, and comprises the "determination processing portion" or "second determination processing portion" of the present invention.

The airbag module ECU 142 fulfills the function of determining the occurrence of an actual side collision of the vehicle 10 based on the information detected by the side impact sensors 120, as well as the function of deriving the displacement velocity (also referred to as the "collision velocity") of the vehicle body at the time of a side collision based on the acceleration information detected by the acceleration sensors 130. While details will be described later, this airbag module ECU 142 further fulfills the function of setting a threshold value related to the displacement velocity of the vehicle body at the time of a side collision based on the processing results of the aforementioned first processing and second processing, as well as the function of outputting a drive control signal to the airbag module 150 based on the processing results of the aforementioned first processing and second processing. The airbag module ECU 142 here comprises the "threshold value setting portion" and "controller" of the present invention.

The airbag module 150, while not particularly shown, comprises at least an airbag and a gas supply device. The airbag is a member that is formed into a bag shape by fabric and capable of inflation and deflation. This airbag deploys and inflates in an occupant restraint region by the supply of gas from the gas supply device when the gas supply device is activated based on the drive control signal outputted from the airbag module ECU 142 of the ECU 140. With this arrangement, it is possible to control the restraint of the vehicle occupant via the airbag of the airbag module 150 at the time of a vehicular accident. This airbag module 150 is an airbag device of a form in which an airbag for restraining an occupant is suitably housed in a seat, pillar, upper roof rail, or the like. The airbag module 150 here functions as a device configured to restrain a vehicle occupant at the time of a vehicular side collision, and is equivalent to the "occupant restraint device" of the present invention.

Note that, in this occupant restraint system 100, an occupant restraint device other than the airbag module 150 may be used as the occupant restraint device controlled by the drive control signal from the airbag module ECU 142 in place of or in addition to the airbag module 150. Examples of occupant restraint devices other than the airbag module 150 include occupant restraint devices such as a seatbelt device, or a warning device that outputs a display and audio to warn occupants of a side collision.

Figure 2:
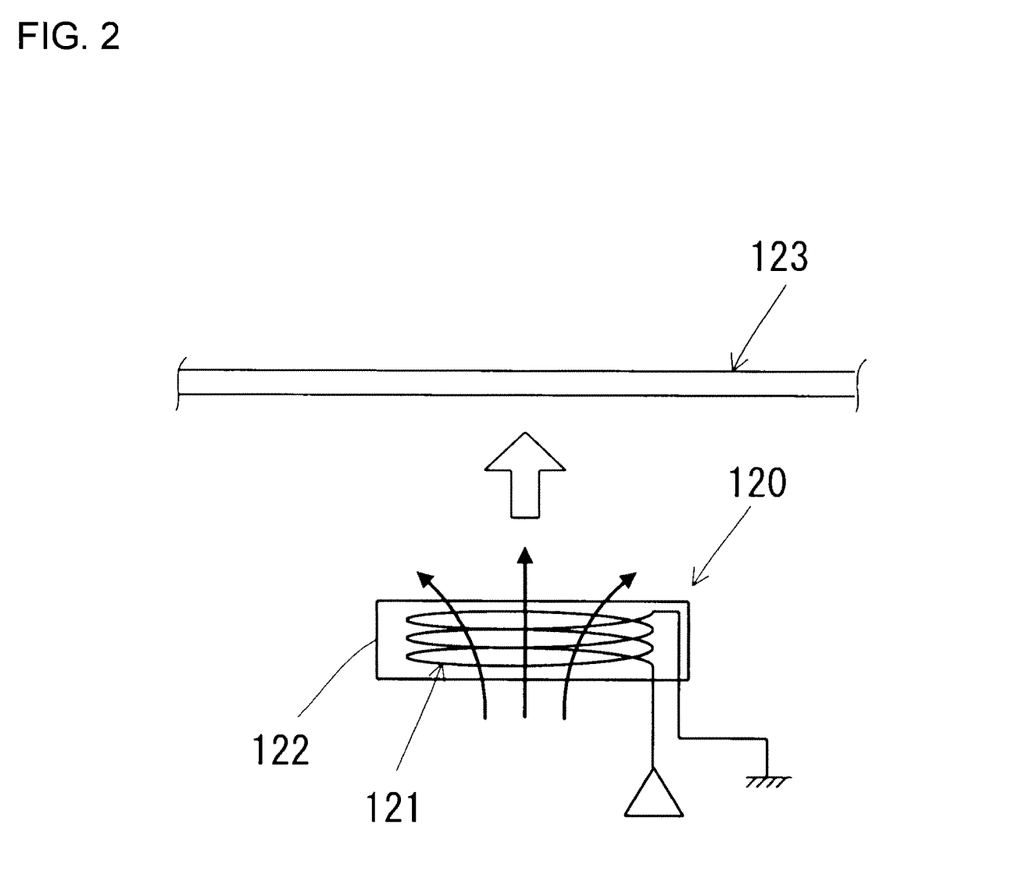
FIG. 2 is a view schematically showing the structure of the side impact sensor of an embodiment of the present invention.
Figure 3:
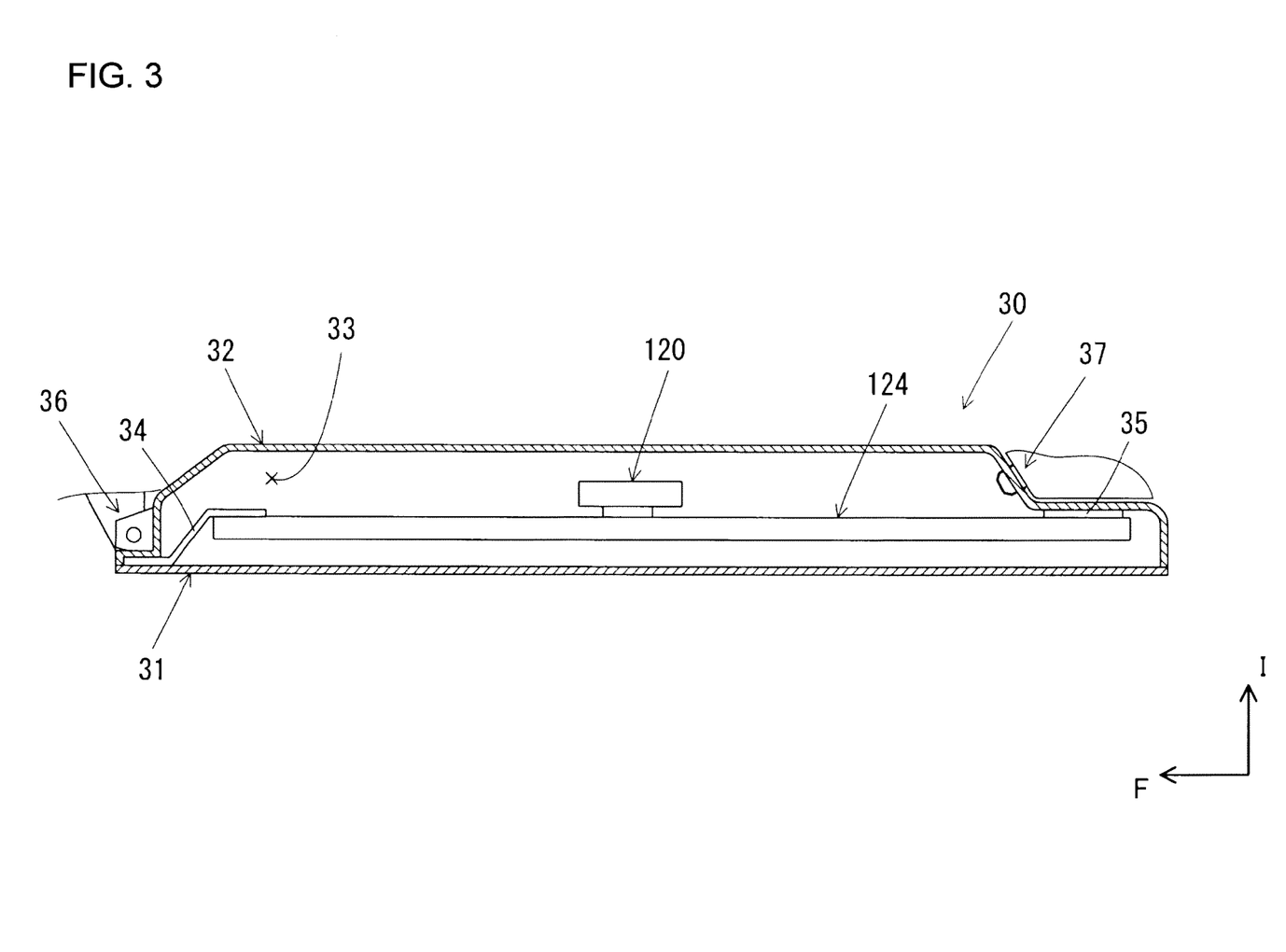
FIG. 3 is a view showing the cross-sectional structure of the vehicle door where the side impact sensor of FIG. 2 is installed.

Next, the specific configuration of the side impact sensor 120 will be described with reference to FIG. 2 and FIG. 3. FIG. 2 shows the specific structure of the side impact sensor 120 of this embodiment, and FIG. 3 schematically shows the cross-sectional structure of the vehicle door 30 on which the side impact sensor 120 of FIG. 2 is mounted. Note that, in FIG. 3, arrow F indicates the direction toward the vehicle front (advancing direction), and arrow I indicates the direction toward the vehicle interior (vehicle compartment).

As shown in FIG. 2, the side impact sensor 120 of this embodiment is a coil sensor that houses a coil portion 121 around which one or a plurality of magnetic sensor coils is wound in an annular shape inside a coil housing 122. The coil portion 121 extends parallel with a detected object made of metal, and the side impact sensor 120 is preferably typically arranged so that the detected surface of a detected object 123 made of metal is generally parallel with the extended flat surface of the coil portion 121. The side impact sensor 120 may be arranged so that the detected surface of the detected object 123 and the extended flat surface of the coil portion 121 are relatively on an incline at a predetermined pitch, as necessary. Then, an AC power supply unit (not shown) is driven to supply AC current (sinusoidal current) to the magnetic sensor coil of the coil portion 121 and, when an AC magnetic field is imparted on the detected object 123 (conductor or magnetic body) located in the periphery, an eddy current occurs in the detected object 123 as a result of the law of electromagnetic conduction. A magnetic field is then formed by this eddy current, and a portion of this magnetic field interplays with the magnetic sensor coil. In the end, the magnetic flux caused by the eddy current introduced to the detected object 123 is added to the magnetic flux caused by the current introduced by the AC power supply unit, and the combined magnetic flux produces induced voltage in the magnetic sensor coil of the coil portion 121.

The side impact sensor 120 is capable of detecting the distance to the detected object 123 based on the change in the current introduced to the magnetic sensor coil at this time. With this arrangement, the amount of deformation related to the vehicle door 30 (the amount of deformation of a door outer panel 31) at the time of a side collision of the vehicle 10 is detected as a change in distance to the detected object 123 based on the change in current at the time of magnetic sensor coil conduction. The detected object 123 in this case is the detected object of the coil sensor, and is configured as a conductor or magnetic body that contains, for example, steel, aluminum, ferrite, or the like. In particular, aluminum has high conductivity, causing the coil sensor to introduce a large eddy current. By using a metal that contains aluminum in the configuration of the detected object 123, therefore, the detection sensitivity of the sensor is effectively improved. Such a side impact sensor 120 (coil sensor) used in a coil for detecting a detected object made of metal is a non-contact type sensor and, with characteristics such as high impact resistance, impact non-responsiveness, and low susceptibility to the environment, effectively maintains the desired detection accuracy in relation to a side collision.

As shown in FIG. 3, the vehicle door 30 of the vehicle 10 connects with a vehicle body 37 via a door hinge 36. This vehicle door 30 comprises the door outer panel 31 that forms the outer wall of the vehicle, and a door inner panel 32 that forms the inner wall of the vehicle. The vehicle door 30 may serve as a front seat door installed between pillar A and pillar B, or a rear seat door installed between pillar B and pillar C of the vehicle 10. A door beam 124 made of metal is installed in a partitioned region 33 between the door outer panel 31 and the door inner panel 32. The door outer panel 31, the door inner panel 32, and the partitioned region 33 here are equivalent to the "door outer panel," "door inner panel," and "partitioned region" of the present invention, respectively.

The door beam 124 is a cylinder-shaped, rod-shaped, or pillar-shaped member that extends into a long shape in the front-back direction of the vehicle. This door beam 124 is fixed to the vehicle body 37 via a vehicle front side bracket 34 on one end, and to the vehicle body 37 via a vehicle rear side bracket 35 on the other end. That is, this door beam 124 is installed lengthwise between the door front end portion (vehicle front side bracket 34) and the door rear end portion (vehicle rear side bracket 35) in the vehicle front-back direction, with both ends corresponding to the brackets 34 and 35 fixed.

The side impact sensor 120 of the above-described configuration is installed in a predetermined installation region facing the surface opposite the door inner panel 32 (the detected surface of the detected object 123) of the door beam 124. Note that this side impact sensor 120 may be provided directly to the door beam 124 itself or to another member fixed to the door beam 124. Or, a configuration may be adopted wherein the side impact sensor 120 is mounted to the door inner panel 32 side. In this case, the detected surface of the detected object 123 is preferably provided to the door beam 124 itself or to another member fixed to the door beam 124.

Figure 4:
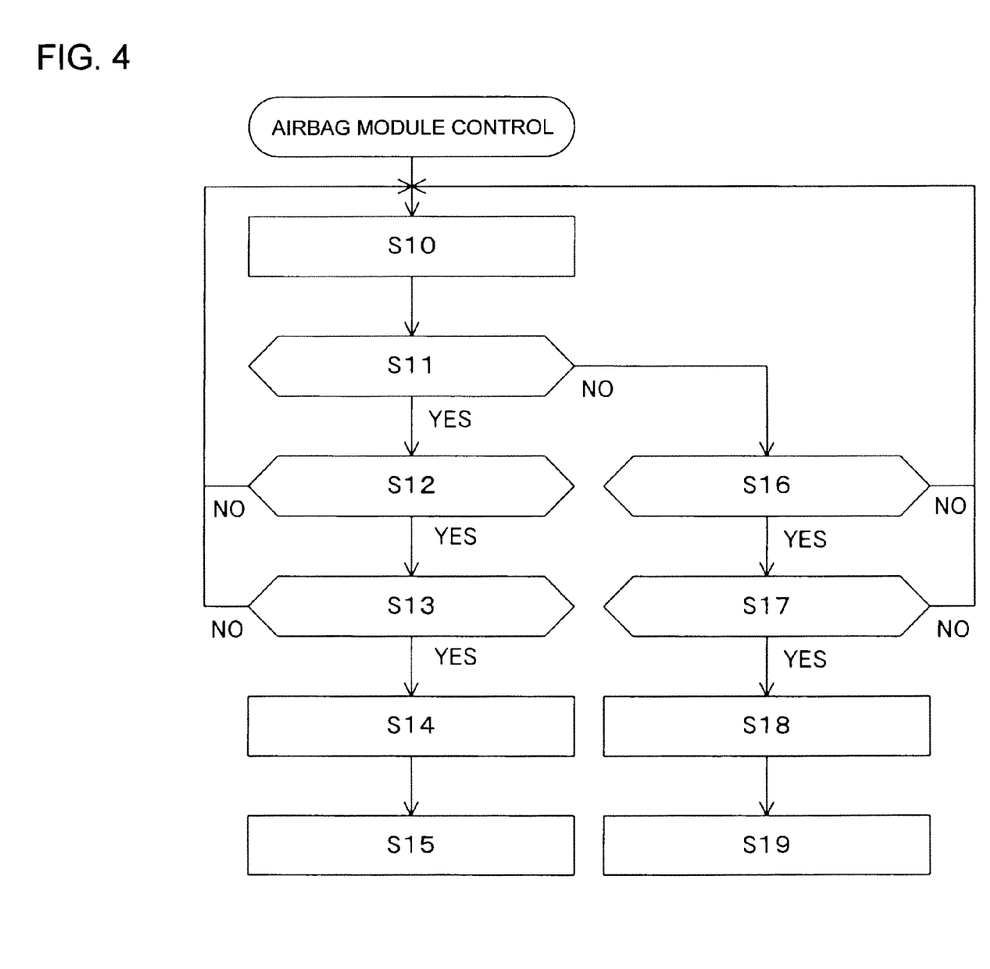
FIG. 4 is a flowchart related to the control of the airbag module of the embodiment.

Next, the action of the occupant restraint system 100 of the above-described configuration will now be described with reference to FIG. 4. FIG. 4 shows a flowchart related to control of the airbag module of this embodiment. Note that the control contents indicated in this flowchart are executed in coordination by the image processing ECU 141 and the airbag module ECU 142.

Assume a case where the vehicle 10 and the colliding object (colliding object P in FIG. 1) are relatively close to each other and an actual collision is about to occur. In such a case, the airbag module control described in FIG. 4 may be used. In this airbag module control process, first the image processing ECU 141 continually performs monitoring via the cameras 110 in step S10. With this arrangement, in a case where the colliding object P exists in a detection region (detection region A in FIG. 1) located in a lateral direction of the vehicle, the image of this colliding object P is detected by the cameras 110.

Next, the image processing ECU 141 in step S11 determines whether or not the image of the colliding object P detected by the cameras 110 is a pole-like (rod-like) object (equivalent to the aforementioned "first determination processing"). With this arrangement, the image processing ECU 141 determines whether or not the image of the colliding object P is a pole-like object. Note that, in this step S11, one of three forms of determination can be adopted: a first form of determining whether or not the image of the colliding object P detected by the cameras 110 is a pole-like object, a second form of determining if the image of the colliding object P detected by the cameras 110 is a pole-like object or a barrier-like (flat-shaped) object, or a third form of determining if the image of the colliding object P detected by the cameras 110 is a pole-like object, a barrier-like object, or an object other than a pole-like object or barrier-like object.

The image processing ECU 141 proceeds to the processing in step S12 in a case where it has determined that the image of the colliding object P detected by the cameras 110 is a pole-like object (YES in step S11), and proceeds to the processing in step S16 in any other case, that is, in a case where it has determined that the image of the colliding object P detected by the cameras 110 is not a pole-like object (NO in step S11).

In both step S12 and step S16, the image processing ECU 141 determines prior to side collision occurrence the predicted collision area where collision of the colliding object P is predicted on the vehicle 10 based on an image of the colliding object P detected by the cameras 110 (equivalent to the aforementioned "second determination processing"). With this arrangement, the image processing ECU 141 determines whether or not the predicted collision area of the colliding object P is the vehicle door 30. The image processing ECU 141 advances the processing to step S13 or step S17 if it had determined that the predicted collision area of the colliding object P is the vehicle door 30 (if YES in step S12 or step S16), and returns the processing to step S10 if it has determined otherwise (if NO in step S12 or step S16).

In both step S13 and step S17, the airbag module ECU 142 determines whether or not the colliding object actually collided with the vehicle 10 based on the information detected by the side impact sensors 120. The airbag module ECU 142 advances the processing to step S14 or step S18 if it has determined that the colliding object actually collided with the vehicle 10 (if YES in step S13 or step S17), and returns the processing to step S10 if it has determined otherwise, that is, if it has determined that the colliding object actually did not collide with the vehicle 10 (the collision was avoided; if NO in step S13 or step S17).

Note that if the colliding object actually collides with the vehicle 10, the door outer panel 31 of the vehicle door 30 shown in FIG. 3 receives an impact from outside the vehicle (downward in FIG. 3), and is displaced ("deformed" or "moved") toward the vehicle interior (upward in FIG. 3). At this time, the door outer panel 31 is displaced toward the vehicle interior by the side collision with the colliding object, and the door beam 124 thus pressed via the door outer panel 31 bends toward the vehicle interior. At the time of the bending motion of the door beam 124, the side impact sensor 120 comes near the detected object (opposite surface) on the side of the door inner panel 32 and is displaced toward the vehicle interior. With this arrangement, the coil portion 121 of the side impact sensor 120 detects the change in distance to the detected object (opposite surface), which is on the side of the door inner panel 32 and made of a metal body as previously described, and the airbag module ECU 142 detects the side collision of the vehicle 10 based on this distance change.

In step S14, the image processing ECU 141 transmits recognition information indicating that the colliding object P is a pole-like object to the airbag module ECU 142, and subsequently advances the processing to step S15. On the other hand, in step S18, the image processing ECU 141 transmits recognition information indicating that the colliding object P is not a pole-like object to the airbag module ECU 142, and subsequently advances the processing to step S19.

In step S15, the airbag module ECU 142 uses the threshold value for a pole collision corresponding to a case where the colliding object P is a pole-like object, and controls the airbag module 150 using a form of control that is based on this threshold value for a pole collision. On the other hand, in step S19, the airbag module ECU 142 uses the threshold value for a normal collision corresponding to a case where the colliding object P is an object other than a pole-like object, and controls the airbag module 150 using a form of control that is based on this threshold value for a normal collision. This threshold value for a normal collision can also be used as the threshold value for a barrier collision corresponding to a case where the colliding object P is a barrier-shaped barrier-like object.

In the above-described step S19, the airbag module ECU 142 outputs a drive control signal to the airbag module 150 if a displacement velocity V (also referred to as "collision velocity") of the vehicle 10 at the time of the side collision is greater than a threshold value Va determined in advance. With this arrangement, the airbag deploys and inflates in the occupant restraint region to restrain the vehicle occupant. The control mode from step S16 to step S19 described here is equivalent to the "first control mode" of the present invention.

Conversely, in the above-described step S15, the airbag module ECU 142 outputs a drive control signal to the airbag module 150 if the displacement velocity V of the vehicle 10 at the time of the side collision is greater than a threshold value Vb, which is less than the threshold value Va (Vb<Va). That is, according to this embodiment, the airbag module ECU 142 varies the threshold value related to the displacement velocity V that drives the airbag module 150 according to the shape or type of the colliding object P and, particularly in a case where the colliding object P is a pole-like object, sets the threshold to a value that is relatively low compared to other colliding objects, such as a case where the colliding object P is a barrier-shaped barrier-like object. The control mode from step S12 to step S15 described here is equivalent to the "second control mode" of the present invention.

As described above, according to this embodiment, the airbag module ECU 142 employs the threshold value Va (equivalent to the "first threshold value" of the present invention) for the threshold value setting of the displacement velocity V in a case where the colliding object P is an object other than a pole-like object, and employs the threshold value Vb (equivalent to the "second threshold value" of the present invention) in a case where the colliding object P is a pole-like object. Furthermore, when the side impact sensor 120 detects a side collision of the vehicle 10, the predicted collision area is the vehicle door 30, and the colliding object P is an object other than a pole-like object, this airbag module ECU 142 enters first control mode and outputs a drive control signal to the airbag module 150 under the condition that the displacement velocity V of the vehicle 10 is greater than the threshold value Va. In addition, when the side impact sensor 120 detects a side collision of the vehicle 10, the predicted collision area is the vehicle door 30, and the colliding object P is a pole-like object, this airbag module ECU 142 enters second control mode and outputs a drive control signal to the airbag module 150 under the condition that the displacement velocity V of the vehicle 10 is greater than the threshold value Vb.

According to such a configuration, even in a case where the displacement velocity V of the vehicle 10 at the time of a side collision is low, settings are set so that the airbag module ECU 142 decreases the threshold value for outputting a drive control signal to the airbag module 150 when the colliding object P is a pole-shaped pole-like object, thereby making it possible to thoroughly restrain the vehicle occupant by the airbag module 150. In addition, with the provision of a step that determines the predicted collision area where the colliding object P is predicted to collide with the vehicle 10 prior to the side collision, the airbag module ECU 142 controls the drive of the airbag module 150 only in a case where the image processing ECU 141 predicts that the colliding object P will collide with the vehicle door 30, thereby making it possible to improve the reliability of occupant restraint control.

Other Embodiments

The present invention is not limited to the above-described embodiment only, and various applications and modifications are possible. For example, each of the following embodiments, which apply the above-described embodiment, may also be implemented.

In the above-described embodiment, it is possible to omit the step of determining prior to a side collision the predicted collision area where the colliding object P is predicted to collide with the vehicle 10 (step S12 and step S16 in FIG. 4). In such a case, when the side impact sensor 120 detects a side collision of the vehicle 10 and the colliding object P is an object other than a pole-like object, this airbag module ECU 142 enters first control mode and outputs a drive control signal to the airbag module 150 under the condition that the displacement velocity V of the vehicle 10 is greater than the threshold value Va. In addition, when the side impact sensor 120 detects a side collision of the vehicle 10 and the colliding object P is a pole-like object, the airbag module ECU 142 enters second control mode and outputs a drive control signal to the airbag module 150 under the condition that the displacement velocity V of the vehicle 10 is greater than the threshold value Vb. According to such a configuration as well, when the colliding object P is a pole-shaped pole-like object, settings are set so that the threshold value for outputting a drive control signal to the airbag module 150 is decreased, thereby making it possible to thoroughly restrain the vehicle occupant by the airbag module 150.

In addition, while the above-described embodiment describes a case where a coil sensor having a magnetic sensor coil arranged opposite a detected object that is made of metal is used as the side impact sensor 120, the present invention allows use of a pressure sensor that detects the deformation (collapse) of the vehicle door by a pressure change within the vehicle door in addition to the coil sensor.

In addition, while the above-described embodiment describes the control of the airbag module 150 that restrains the vehicle occupant using an airbag as the occupant restraint device, the present invention allows use of other occupant restraint devices in addition to or in place of the airbag module 150, such as a seatbelt device that restrains the chest and abdomen of an occupant seated in a vehicle seat.

Further, while the above-described embodiment describes the configuration of an occupant restraint system mounted to an automobile, the present invention can be applied to the configuration of an occupant restraint system mounted to various vehicles, including automobiles, trains, buses, or trucks.

What is claimed is:

1. A collision determination system mounted in a vehicle comprising:
    a camera for image detection arranged facing a lateral direction of said vehicle;
    a side impact sensor arranged in a partitioned region partitioned between a door outer panel of a vehicle door and a door inner panel of the vehicle door for detecting a side collision of said vehicle;
    an acceleration sensor configured to detect an acceleration at a time of the side collision of said vehicle; and
    an ECU,
    wherein said ECU is configured to execute processes including:
        a determination process for inputting an image detected by said camera and for determining whether a shape of a colliding object involved in the side collision of said vehicle is a pole-like object or not, based on the image inputted;
        a threshold value setting process for:
            setting as a first threshold value a threshold value of collision velocity based on the acceleration when in said determination process it is determined that said colliding object is an object other than the pole-like object, and
            setting as a second threshold value that is below said first threshold value a threshold value of the collision velocity based on the acceleration when in said determination process it is determined that said colliding object is the pole-like object; and
        a switching process for switching between a first control mode and a second control mode,
    wherein the first control mode is configured to output a drive control signal to an occupant restraint device that restrains a vehicle occupant under a condition that the collision velocity based on the acceleration detected by said acceleration sensor is greater than said first threshold value set in said threshold value setting process when said side impact sensor detects the side collision of said vehicle and it is determined that said colliding object is the object other than the pole-like object in said determination process, and
    wherein the second control mode is configured to output the drive control signal to said occupant restraint device under a condition that the collision velocity based on the acceleration detected by said acceleration sensor is greater than said second threshold value set in said threshold value setting process when said side impact sensor detects the side collision of said vehicle and it is determined that said colliding object is the pole-like object in said determination process.

2. A collision determination system mounted in a vehicle comprising:
    a camera for image detection arranged facing a lateral direction of said vehicle;
    a side impact sensor arranged in a partitioned region partitioned between a door outer panel of a vehicle door and a door inner panel of the vehicle door for detecting a side collision of said vehicle;
    an acceleration sensor configured to detect an acceleration at a time of the side collision of said vehicle; and
    an ECU,
    wherein said ECU is configured to execute processes including:
        a first determination process for inputting an image detected by said camera and for determining whether a shape of a colliding object involved in the side collision of said vehicle is a pole-like object or not, based on the image inputted;
        a second determination process for inputting the image detected by said camera and for determining whether a predicted collision area of said vehicle where said colliding object is collided is a vehicle door or not, based on the image inputted;
        a threshold value setting process for:
            setting as a first threshold value a threshold value of collision velocity based on the acceleration when in said first determination process it is determined that said colliding object is as an object other than the pole-like object, and
            setting as a second threshold value that is below said first threshold value a threshold value of the collision velocity based on the acceleration when in said first determination process it is determined that said colliding object is the pole-like object; and
        a switching process for switching between a first control mode and a second control mode,
    wherein the first control mode is configured to output a drive control signal to an occupant restraint device that restrains a vehicle occupant under a condition that the collision velocity based on the acceleration detected by said acceleration sensor is greater than said first threshold value set in said threshold value setting process when said side impact sensor detects the side collision of said vehicle, and it is determined that said predicted collision area is said vehicle door in said second determination process, and said colliding object is the object other than the pole-like object in said first determination process, and
    wherein the second control mode is configured to output the drive control signal to said occupant restraint device under a condition that the collision velocity based on the acceleration detected by said acceleration sensor is greater than said second threshold value set in said threshold value setting process when said side impact sensor detects the side collision of said vehicle, it is determined that said predicted collision area is said vehicle door in said second determination process, and said colliding object is the pole-like object in said first determination process.

3. The collision determination system according to claim 1, wherein said side impact sensor is a coil sensor comprising a magnetic sensor coil arranged opposite a detected object made of metal that exists in the partitioned region partitioned between the door outer panel and the door inner panel of said vehicle door, and is configured to detect an amount of deformation related to said vehicle door at the time of the side collision of said vehicle as a distance change to said detected object based on a current change at a time of conduction of said magnetic sensor coil.

4. An occupant restraint system comprising:
the collision determination system according to claim 1; and
the occupant restraint device configured to restrain the vehicle occupant based on a determination result of said collision determination system at the time of the side collision of said vehicle.

5. A vehicle comprising:
an engine driving system;
an electrical equipment system;
a drive control device configured to control a drive of said engine driving system and said electrical equipment system;
a vehicle door used by a vehicle occupant to get in and out of said vehicle, wherein a door outer panel is displaceable by a side collision;
a collision determination device configured to determine side collision particulars of said vehicle door; and
an occupant restraint device configured to restrain the vehicle occupant based on a determination result of said collision determination device at a time of the side collision of said vehicle;
wherein said collision determination device comprises the collision determination system according to claim 1.

6. The collision determination system according to claim 2, wherein said side impact sensor is a coil sensor comprising a magnetic sensor coil arranged opposite a detected object made of metal that exists in the partitioned region partitioned between the door outer panel and the door inner panel of said vehicle door, and is configured to detect an amount of deformation related to said vehicle door at the time of the side collision of said vehicle as a distance change to said detected object based on a current change at a time of conduction of said magnetic sensor coil.

7. A vehicle comprising:
an engine driving system;
an electrical equipment system;
a drive control device configured to control a drive of said engine driving system and said electrical equipment system;
a vehicle door used by a vehicle occupant to get in and out of said vehicle, wherein a door outer panel is displaceable by a side collision;
a collision determination device configured to determine side collision particulars of said vehicle door; and
an occupant restraint device configured to restrain the vehicle occupant based on a determination result of said collision determination device at a time of the side collision of said vehicle;
wherein said collision determination device comprises the collision determination system according to claim 2.

8. The collision determination system according to claim 1, wherein the acceleration detected by the acceleration sensor and used by the ECU in the threshold value setting process is the acceleration at time of actual physical contact with said vehicle.

9. The collision determination system according to claim 2, wherein the acceleration detected by the acceleration sensor and used by the ECU in the threshold value setting process is the acceleration at time of actual physical contact with said vehicle.

* * * * *